(12) United States Patent
Cooper et al.

(10) Patent No.: US 7,654,318 B2
(45) Date of Patent: Feb. 2, 2010

(54) FLUID DIVERSION MEASUREMENT METHODS AND SYSTEMS

(75) Inventors: Iain Cooper, Sugar Land, TX (US); Bart Thomeer, Houston, TX (US); Colin Whittaker, Phuket (TH); Carolina Dautriche, Chatenay-Malabry (FR); Murtaza Ziauddin, Richmond, TX (US); Gary Oddie, St. Neots (GB); Fadhel Rezgui, Chatillon (FR); Andrew Parry, Bourg la Reine (FR); Chris Lenn, London (GB); Steve Davies, Sugar Land, TX (US); Warren Zemlak, Moscow (RU); Moussa Kane, Houston, TX (US); Frank F. Espinosa, Richmond, TX (US); Gokturk Tunc, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/562,546

(22) Filed: Nov. 22, 2006

(65) Prior Publication Data

US 2007/0289739 A1    Dec. 20, 2007

Related U.S. Application Data

(60) Provisional application No. 60/813,612, filed on Jun. 19, 2006.

(51) Int. Cl.
*E21B 47/00* (2006.01)
(52) U.S. Cl. .................................. 166/250.01; 166/66
(58) Field of Classification Search ............ 166/250.01, 166/305.1, 66, 222
See application file for complete search history.

(56) References Cited

U.S. PATENT DOCUMENTS 2,558,427 A    6/1951  Fagan (Continued)

FOREIGN PATENT DOCUMENTS

DE    2818656    10/1979

(Continued)

OTHER PUBLICATIONS

Fiber optic Sensors and Applications by D. A. Krohn 2000, Instrumentation Systems (ISBN No. 1556177143).

(Continued)

*Primary Examiner*—David J Bagnell
*Assistant Examiner*—Sean D Andrish
(74) *Attorney, Agent, or Firm*—Michael Flynn; David Cate; Robin Nava (57) ABSTRACT

Fluid diversion measurement systems and methods are described. One system includes a section of tubular having a main flow passage and a fluid diversion port, the section of tubular adapted to be either moving or stationary during a fluid diversion operation, at least two sensors in the section of tubular, at least one sensor located upstream of the fluid diversion port and at least one sensor located downstream of the fluid diversion port, each sensor adapted to measure a parameter of a fluid diverted into a wellbore through the fluid diversion port; and means for using the measured parameters in realtime to monitor, control, or both monitor and control diversion of the fluid. This abstract allows a searcher or other reader to quickly ascertain the subject matter of the disclosure. It will not be used to interpret or limit the scope or meaning of the claims. 37 CFR 1.72(b).

23 Claims, 5 Drawing Sheets

U.S. PATENT DOCUMENTS

| | | | |
|---|---|---|---|
| 4,162,400 A | 7/1979 | Pitts, Jr. | |
| 4,346,478 A | 8/1982 | Sichling | |
| 4,366,362 A | 12/1982 | Ohta | |
| 4,525,874 A | 6/1985 | Baues | |
| 4,852,790 A | 8/1989 | Karlinski | |
| 4,859,054 A | 8/1989 | Harrison | |
| 4,861,986 A | 8/1989 | Arnold | |
| 5,121,872 A | 6/1992 | Legget | |
| 5,350,018 A * | 9/1994 | Sorem et al. | 166/250.07 |
| 5,434,395 A | 7/1995 | Storck | |
| 5,435,351 A | 7/1995 | Head | |
| 5,485,745 A | 1/1996 | Rademaker | |
| 5,503,370 A | 4/1996 | Newman | |
| 5,542,471 A | 8/1996 | Dickinson | |
| 5,566,706 A | 10/1996 | Harpenau | |
| 5,573,225 A | 11/1996 | Boyle | |
| 5,599,004 A | 2/1997 | Newman | |
| 5,667,706 A | 9/1997 | Pirl | |
| 5,699,996 A | 12/1997 | Boyle | |
| 5,892,176 A | 4/1999 | Findlay | |
| 6,009,216 A | 12/1999 | Pruett | |
| 6,192,983 B1 | 2/2001 | Neuroth | |
| 6,268,911 B1 | 7/2001 | Tubel | |
| 6,281,489 B1 | 8/2001 | Tubel | |
| 6,349,768 B1 | 2/2002 | Leising | |
| 6,419,014 B1 | 7/2002 | Meek | |
| 6,450,257 B1 | 9/2002 | Douglas | |
| 6,474,152 B1 | 11/2002 | Mullins | |
| 6,496,624 B1 | 12/2002 | Hikita | |
| 6,502,634 B1 * | 1/2003 | Evans et al. | 166/250.03 |
| 6,519,568 B1 | 2/2003 | Harvey | |
| 6,531,694 B2 | 3/2003 | Tubel | |
| 6,557,630 B2 | 5/2003 | Harkins | |
| 6,667,280 B2 | 12/2003 | Chang | |
| 6,690,866 B2 | 2/2004 | Bonja | |
| 7,077,200 B1 | 7/2006 | Adnan | |
| 2002/0007945 A1 | 1/2002 | Neuroth | |
| 2002/0109080 A1 | 8/2002 | Tubel | |
| 2003/0010495 A1 | 1/2003 | Mendez | |
| 2003/0131990 A1 | 7/2003 | Tubel | |
| 2004/0035577 A1 * | 2/2004 | Ramakrishnan et al. | 166/250.07 |
| 2004/0084190 A1 | 5/2004 | Hill | |
| 2004/0129418 A1 | 7/2004 | Jee | |

FOREIGN PATENT DOCUMENTS

| | | |
|---|---|---|
| DE | 29816469 | 2/1999 |
| EP | 0203249 | 12/1986 |
| EP | 0400707 A2 | 12/1990 |
| EP | 0853249 | 7/1998 |
| FR | 2745847 | 3/1996 |
| GB | 2177231 | 1/1987 |
| GB | 2275953 | 9/1994 |
| GB | 2291187 A | 1/1996 |
| GB | 2299868 | 10/1996 |
| GB | 2362463 A | 11/2001 |
| GB | 2392462 | 3/2004 |
| JP | 4295810 | 10/1992 |
| JP | 6309943 | 11/1994 |
| WO | 0036386 | 6/2000 |

OTHER PUBLICATIONS

Photonic Analog-to-Digital Conversion (Springer Series in Optical Sciences, 81) by B. Stoop, Published by Springer-Verlag in 2001.

Fiber Optic Flourosensor for Oxygen and Carbon Dioxide, Anal. Chem. 60, 2028-2030(1998) by O.S. Wolfbeis, L. Weis, M.J. P. Leiner and W. E. Ziegler.

Journal of testing and evaluation, vol. 21, Issue 5 in Sep. 1993 by M. H. Maher and M. R. Shahriari.

* cited by examiner

FLUID DIVERSION MEASUREMENT METHODS AND SYSTEMS

CROSS-REFERENCE TO RELATED APPLICATION

The present application claims priority of a provisional application Ser. No. 60/813,612, titled "Fluid Diversion Measurement Methods and Systems" filed Jun. 19, 2006, the contents of which are incorporated by reference herein in its entirety.

BACKGROUND OF THE INVENTION

1. Field of Invention

The present invention relates generally to oilfield fluid diversion systems and methods, and more specifically to fluid diversion measurement systems and methods that may use a pre-job design that may be executed and evaluated in realtime to ensure treatment fluid is efficiently diverted in a reservoir.

2. Related Art

It may be appreciated that stimulation diversion processes and systems have been in use for years. Typically, stimulation diversion processes and systems are comprised of downhole production logging tools (PLT), radioactive tracers with gamma ray detection tools and fiber optic strings measuring distributed temperature. These measurements in the PLT usually have single pressure, single flow meter, gamma ray and temperature. The data from these downhole tools are realtime when an electric cable and/or fiber optic fiber is connected inside the coiled tubing string, or in memory mode when the data is collected after the job.

The main problems with conventional stimulation diversion processes and systems are that interpretation of the measurements, whether gathered in realtime or delayed, may be difficult. In most cases, interpretation will come hours after the data is collected. If the telemetry system is not hardwired to the surface, the delay time/data time to the surface also becomes a hardship on timing for interpretation. Another problem with conventional stimulation diversion processes and systems is that the measurements were not designed to provide a qualitative answer to the service that is being performed. One of the many services is flow diversion of fluid into a reservoir section of a well. Another problem with conventional stimulation diversion processes and systems is that they were never designed to run on the end of oilfield tubulars such as coiled tubing. This is especially true for the logging tool flow meters which are designed to be run on the end of cable. This makes them vulnerable to damage. Existing systems also typically use a wired cable in the coiled tubing that increases weight while decreasing reliability.

While existing processes and systems may be suitable for the particular purpose to which they address, they are not as suitable for processes that may use a pre-job design that may be executed and/or evaluated in realtime to ensure treatment fluid is efficiently diverted in a reservoir. Previously known processes' and systems' use of multiple sensors and/or measurements were typically not strategically placed or adapted for flow measurements in coiled tubing and/or drill pipe.

Figure 1:
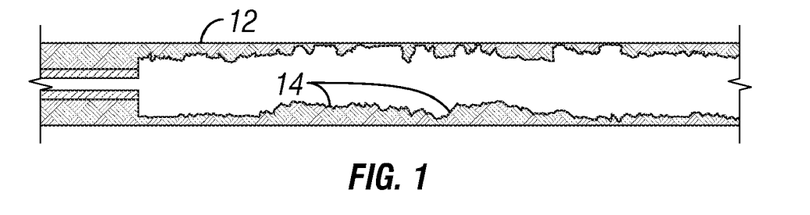
FIG. 1 is a schematic cross-sectional view of a horizontal wellbore having debris along the lower wall.

In terms of the types of flowmeters, spinners are commonplace for measuring downhole flowrates, profiling flow velocities across the flowpath, and determining the phase distributions if multiple phases are present. Spinners are known to be fragile in certain circumstances and are prone to blade breakage, bearing damage, and jamming by foreign objects. This is especially true in 'barefoot' well completions where the wellbore may not be smooth. Debris accumulation on the low side of the hole may damage or even destroy a spinner. FIG. 1 illustrates schematically a horizontal well, 12, having low-side debris accumulation 14. Therefore, because of the vulnerability of the mini-spinners it is worthwhile considering alternative technologies that could replace them within the stimulation and treatment environment. Indeed, even though the risk of damage in the stimulation application is lower than the production logging application, an alternative type of flowmeter may be worth evaluating.

Figure 2:
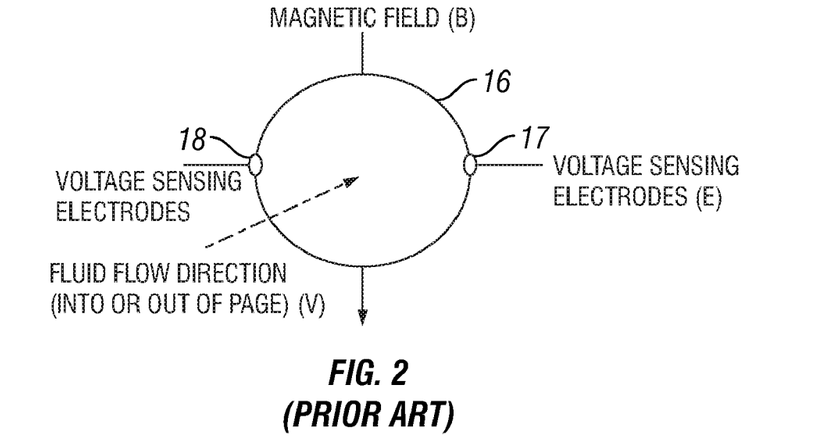
FIG. 2 is a highly schematic cross-sectional view of a prior art electromagnetic flowmeter that may used in systems and methods of the invention.

Electromagnetic flowmeters for the measurement of the velocity of conducting fluids are commercially available. Increasingly they are becoming available for less conducting fluids despite the technical challenges. The electromagnetic flowmeter principle is described in relation to FIG. 2. The operation of electromagnetic flowmeters is based on Faraday's law of electromagnetic induction. Electromagnetic flow meters (sometimes referred to as magnetic flowmeters, or simply magmeters) measure the velocity of fluids in a pipe, and if the pipe cross-sectional area is known then they may measure the volumetric flowrate. Full-bore magmeters usually comprise a non-magnetic pipe 16 lined with an insulating material (not illustrated). Electromagnetic coils (not illustrated) create the required B-field and a pair of electrodes 17, 18 penetrate the pipe and its lining as illustrated schematically in FIG. 2. As a fluid flows through the magnetic field (B) generated by the coils, a voltage (E) is developed across electrodes 17, 18. The voltage will be proportional to the velocity (V) of the liquid. Usually, as the magnetic field density and the pipe diameter are fixed values, they are converted into a calibration factor (K) giving a simple relationship between voltage and fluid velocity:

$$E = K \times V$$

Magmeters may measure flow in both directions, as reversing fluid direction will change the polarity but not the magnitude of the signal. Magnetic flowmeters may detect the flow of clean, multi-phase, dirty, corrosive, erosive, or viscous liquids and slurries as long as their conductivity exceeds the minimum required for the particular design. The expected accuracy and range of the better designs are from 0.2-1% of rate, over a range of 10:1 to 30:1, if the flow velocity exceeds 1 ft/sec [31 cm/sec]. At slower flow velocities (even below 0.1 ft/s [0.3 cm/sec]), measurement error increases, but the readings remain repeatable, which is key for logging tool applications. Originally, magmeters could detect the flow of conductive fluids only. Early magmeter designs required a minimum fluidic conductivity of 1-5 microsiemens per centimeter for their operation. The newer designs have reduced that requirement a hundredfold to between 0.05 and 0.1 microsiemens, and maybe now much lower.

Figure 3A:
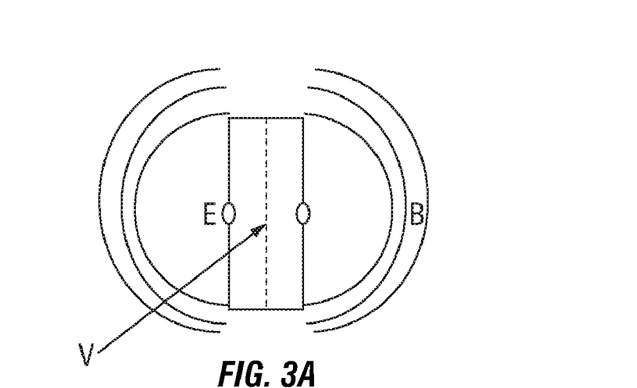
FIGS. 3A and 3B are schematic cross-section and plan views of an insertion-type electromagnetic flowmeter useful in some embodiments of the invention.
Figure 3B:
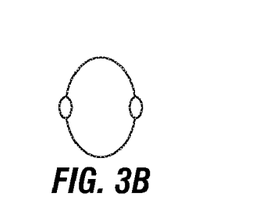

Insertion type electromagnetic flowmeters may be built and such a meter is illustrated schematically in FIGS. 3A and 3B. The relationship between the magnetic field, induced voltage and fluid velocity must respect Faraday's law as illustrated schematically in FIG. 3A. A plan view, FIG. 3B, is illustrated schematically and its symmetry ensures a similar response to a fluid flowing in either direction.

Use in insulating fluids is feasible but design challenges are much greater due to the high source impedance, triboelectric ('static charge') voltage noise and a mean impedance linked gain function (therefore mixing-law dependent). The equation then becomes:

$$E = G(K \times V)$$

where G is a function of the mean mixture dielectric constant. Meters such as this have been considered for application to surface flow measurements, for example U.S. Pat. No. 4,920,795 to Dowell Schlumberger discusses an electromagnetic flowmeter for conductive or dielectric fluids and its applications in oilfields in particular, but the product did not develop due to technology limits then present. General magmeter designs may use capacitive electrodes which permit function with insulating deposits (e.g. an oil film) but would usually need a modulated magnetic field and therefore require an electromagnet to generate the B-field which could impose strength limitations due to coil design/size and current limitations.

From the above it is evident that there is a need in the art for improvement in monitoring oilfield fluid diversion systems and methods.

SUMMARY OF THE INVENTION

In accordance with the present invention, systems (also referred to herein as tools or downhole tools) and methods are described that reduce or overcome problems in previously known systems and methods.

A first aspect of the invention is a method, one method of the invention comprising:
(a) inserting a tubular into a wellbore, the tubular comprising a section of tubing having at least one fluid injection port;
(b) injecting a fluid through the at least one fluid injection port; and
(c) determining differential flow of the fluid at one or more points upstream and downstream of the fluid injection port based on one or more measured parameters.

Methods of the invention include those wherein flow out of the tubular is also measured. The tubular may be selected from coiled tubing (CT) and sectioned pipe wherein the sections may be joined by any means (welds, threaded fittings, flanged fittings, combinations thereof, and the like). Certain methods of the invention are those wherein the injecting of the fluid is through the tubular to a bottom hole assembly (BHA) attached to the distal end of the tubular. Other methods of the invention are those methods wherein the determining differential flow comprises monitoring, programming, modifying, and/or measuring one or more parameters selected from temperature, pressure, rotation of a spinner, measurement of the Hall effect, volume of fluids pumped, fluid flow rates, fluid paths (annulus, tubing or both), acidity (pH), fluid composition (acid, diverter, brine, solvent, abrasive, and the like), conductance, resistance, turbidity, color, viscosity, specific gravity, density, and combinations thereof. Yet other methods of the invention are those wherein the measured parameter is measured at a plurality of points upstream and downstream of the of the injection point. One advantage of systems and methods of the invention is that fluid volumes and time spent on location performing the fluid treatment/stimulation may be optimized.

Exemplary methods of the invention include those comprising executing a pre-job fluid diversion design in realtime (whereby "realtime" encompasses any time from an instantaneous response to the time required to effect a change in surface parameters that will subsequently modify the downhole conditions). Yet other methods include evaluating, modifying, and/or programming the fluid diversion in realtime to ensure treatment fluid is efficiently diverted in a reservoir. By determining more precisely the placement of the treatment fluid(s), which may or may not include solids, for example slurries, the inventive methods may comprise controlling the injection via one or more flow control devices and/or fluid hydraulic techniques to divert and/or place the fluid into a desired location that is determined by the objectives of the operation.

Another aspect of the invention are systems, one system comprising:
(a) a section of tubular having a main flow passage and a fluid diversion port;
(b) at least two sensors in the section of tubular, one sensor located upstream of the fluid diversion port and one sensor located downstream of the fluid diversion port, each sensor adapted to measure a parameter of a fluid diverted into a wellbore through the fluid diversion port; and
(c) means for using the measured parameters in realtime to monitor, control, or both monitor and control diversion of the fluid.

Systems of the invention include those wherein at least one sensor able to detect flow out of the tubular is provided. Systems of the invention include those wherein the sensors may be selected from flow meter spinners, electromagnetic flow meters, thermally active temperature sensors, thermally passive temperature sensors, pH sensors, resistivity sensors, optical fluid sensors, ultrasonic flow velocity sensors, differential pressure flow sensors and radioactive and/or non-radioactive tracer sensors, such as DNA or dye sensors. Certain systems of the invention may include means for using this information in realtime to evaluate and change, if necessary, one or more parameters of the fluid diversion. Means for using the information sensed may comprise command and control sub-systems located at the surface, at the tool, or both. Systems of the invention may include downhole flow control devices and/or means for changing injection hydraulics in both the annulus and tubing injection ports at the surface. Systems of the invention may comprise a plurality of sensors capable of detecting fluid flow out of the tubular, below the tubular and up the annulus between the tubular and the wellbore in realtime mode that may have programmable action both downhole and at the surface. This may be accomplished using one or more algorithms to allow quick realtime interpretation of the downhole data, allowing changes to be made at surface or downhole for effective treatment. Systems of the invention may comprise a controller for controlling fluid direction and/or shut off of flow from the surface. Exemplary systems of the invention may include fluid handling sub-systems able to improve fluid diversion through command and control mechanisms. These sub-systems may allow controlled fluid mixing, or controlled changing of fluid properties. Systems of the invention may comprise one or more downhole fluid flow control devices that may be employed to place a fluid in a prescribed location in the wellbore, change injection hydraulics in the annulus and/or tubular from the surface, and/or isolate a portion of the wellbore.

The inventive systems may further include different combinations of sensors/measurements above and below, (and may also be at) the injection port in the tubular to determine/verify diversion of the fluid.

Systems and methods of the invention may include surface/tool communication through one or more communication links, including but not limited to hard wire, optical fiber, radio, or microwave transmission. In exemplary embodiments, the sensor measurements, realtime data acquisition, interpretation software and command/control algorithms may be employed to ensure effective fluid diversion, for example, command and control may be performed via pre-programmed algorithms with just a signal sent to the surface that the command and control has taken place, the control performed via controlling placement of the injection fluid into the reservoir and wellbore. In other exemplary embodiments, the ability to make qualitative measurements that may be interpreted realtime during a pumping service on coiled tubing or jointed pipe is an advantage. Systems and methods of the invention may include realtime indication of fluid movement (diversion) out the downhole end of the tubular, which may include down the completion, up the annulus, and in the reservoir. Two or more flow meters, for example electromagnetic flow meters, or thermally active sensors that are spaced apart from the point of injection at the end of the tubular may be employed. Other inventive methods and systems may comprise two identical diversion measurements spaced apart from each other and enough distance above the fluid injection port at the end or above the measurement devices, to measure the difference in the flow each sensor measures as compared to the known flow through the inside of the tubular (as measured at the surface).

The inventive methods and systems may employ multiple sensors that are strategically positioned and take multiple measurements, and may be adapted for flow measurement in coiled tubing, drill pipe, or any other oilfield tubular. Systems of the invention may be either moving or stationary while the operation is ongoing. Treatment fluids, which may be liquid or gaseous, or combination thereof, and/or combinations of fluids and solids (for example slurries) may be used in stimulation methods, methods to provide conformance, methods to isolate a reservoir for enhanced production or isolation (non-production), or combination of these methods. Data gathered may either be used in a "program" mode downhole; alternatively, or in addition, surface data acquisition may be used to make real time "action" decisions for the operator to act on by means of surface and downhole parameter control. Fiber optic telemetry may be used to relay information such as, but not limited to, pressure, temperature, casing collar location (CCL), and other information uphole.

The inventive methods and systems may be employed in any type of geologic formation, for example, but not limited to, reservoirs in carbonate and sandstone formations, and may be used to optimize the placement of treatment fluids, for example, to maximize wellbore coverage and diversion from high perm and water/gas zones, to maximize their injection rate (such as to optimize Damkohler numbers and fluid residence times in each layer), and their compatibility (such as ensuring correct sequence and optimal composition of fluids in each layer).

Methods and systems of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics may be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Described herein are oilfield fluid diversion systems and methods, and more specifically fluid diversion measurement systems and methods that may employ a pre-job design that may be executed and evaluated in realtime to ensure treatment fluid is efficiently diverted in a reservoir. As used herein "oilfield" is a generic term including any hydrocarbon-bearing geologic formation, or formation thought to include hydrocarbons, including onshore and offshore. As used herein when discussing fluid flow, the terms "divert", "diverting", and "diversion" mean changing the direction, the location, the magnitude or all of these of all or a portion of a flowing fluid. A "wellbore" may be any type of well, including, but not limited to, a producing well, a non-producing well, an experimental well, and exploratory well, and the like. Wellbores may be vertical, horizontal, some angle between vertical and horizontal, and combinations thereof, for example a vertical well with a non-vertical component. "Pre-job" is a term utilized to signify any of work performed prior to treatment of a wellbore.

Figure 4:
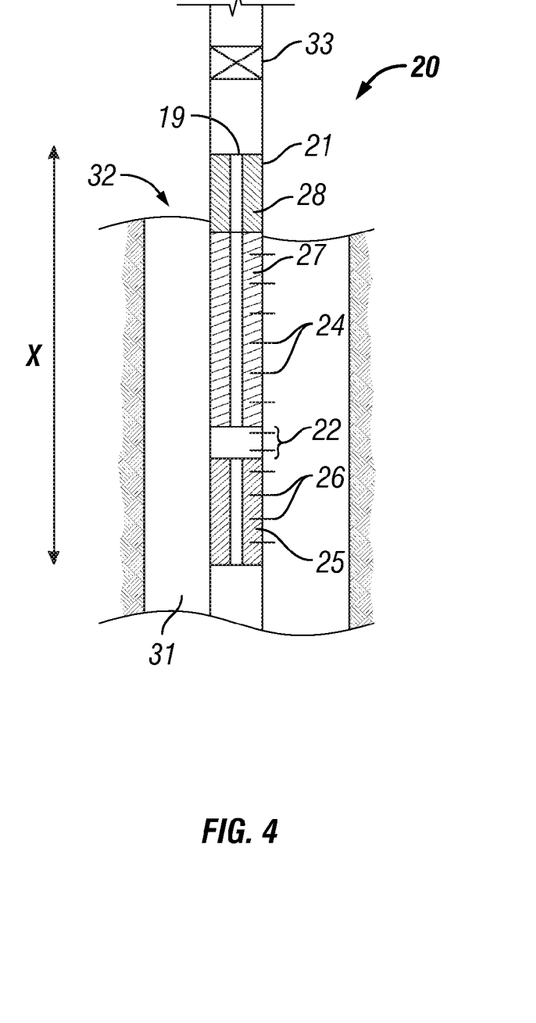
FIGS. 4-6 are schematic cross-sectional views of fluid diversion system embodiments of the invention.
Figure 5:
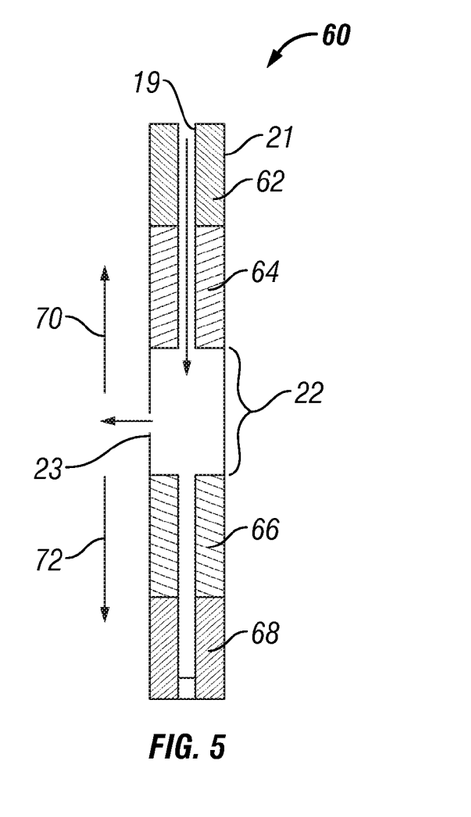

Turning now to the drawing figures, in which similar reference characters denote similar elements throughout the several views, FIGS. 4-10 illustrate several non-limiting embodiments of the inventive fluid diversion measurement systems and methods. FIGS. 4-6 are schematic cross-sectional views of fluid diversion system embodiments of the invention, while FIGS. 7-10 are schematic side-elevation views of other fluid diversion system embodiments of the invention.

FIG. 4 illustrates embodiment 20, having a coiled tubing or other tubular 21 (such as sectioned pipe) disposed in an annulus 31 of a wellbore 32 and having a main fluid flow passage 19 and a fluid injection section 22, which may have one or more fluid injection ports (not illustrated). In those embodiments wherein the tubular 21 is sectioned pipe, the sectioned pipe may be joined by any means 33, such as welds, threaded fittings, flanged fittings, combinations thereof, and the like, Two sensor packages 25 and 27 are illustrated, which may be modular. In embodiment 20, each of section 22 and sensor packages 25 and 27 have one or more temperature sensors 24 and 26. Note that the geometry in FIG. 4 may be controlled such that the pressure drop across the tool is modified by the eccentricity of the tool in the wellbore 32; a larger offset leading to a lower pressure drop.

FIG. 5 illustrates an embodiment 60 also having a coiled tubing 21 or other tubular and main flow passage 19 and a side injection port 23. Arrows 70 and 72 indicate injected fluid flowing up and down the annulus, respectfully. Embodiment 60 of FIG. 5 illustrates one system embodiment of the invention having dual electromagnetic flowmeters 64 and 66. Distributed continuous measurements, e.g., (fiber optic) temperature sensors such as illustrated in FIG. 4 may be positioned between flowmeters 64 and 66. Note that a version with only one flowmeter could also be used. Other such distributed measurements could be used to detect changes in pH, salt, or other inorganic or organic chemical species, such as DNA, which may be indicative of fluid flow direction or fluid placement changes. In addition to the basic sensor/measurement configuration illustrated schematically in FIG. 4, systems of the invention such as embodiment 60 of FIG. 5 may include a downhole measurement sensor package 62 that may communicate with the surface, such as a fiber-optic-based sensor package able to measure parameters such as pressure, temperature, CCL, and which may comprise a rechargeable battery pack 68 that may be charged by flow through the tool in a manner similar to an MWD turbine.

Optionally, systems of the invention may comprise an element (not illustrated) that ensures that the flow measurement device is concentric in the wellbore, and that may be used to orient the tool in a preferred direction. Although not essential, this option may considerably increase the ease of data analysis and interpretation.

Figure 6A:
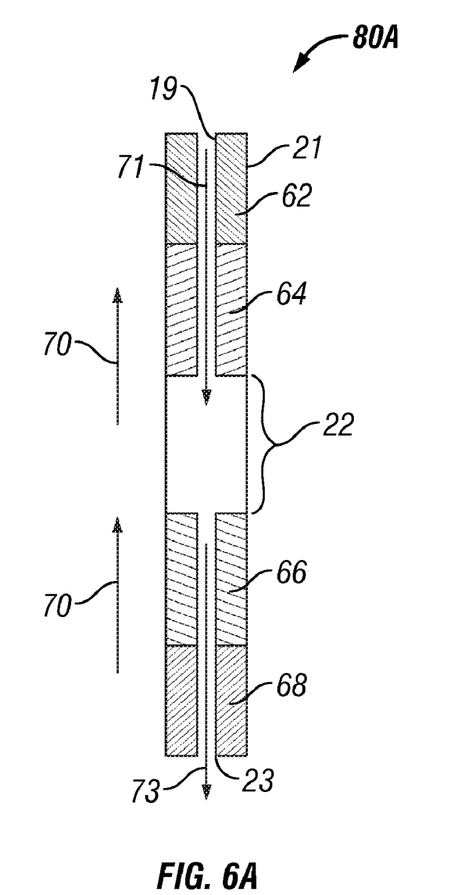
Figure 6B:
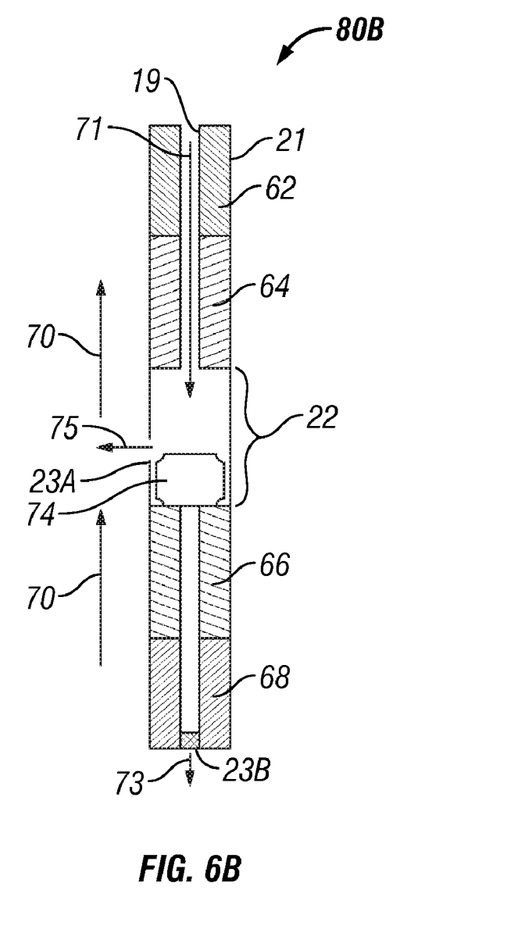

Two other systems of the invention are illustrated in FIGS. 6A and 6B, illustrating embodiments 80A and 80B. Embodiment 80A is similar in most respects to embodiment 60 of FIG. 5, except that injection port 23 is at the bottom of the tool, and an internal flow measurement device 66 (an electromagnetic flowmeter, for example) is coupled with an upper flowmeter 64. Embodiment 80B exploits the technology of a bistable actuator 74 to provide a system of the invention having the capability of switching between an injection port 23a between the two flowmeters 64 and 66, as evidenced by fluid flow arrow 75, and an injection port 23b at the distal end of the system, exemplified by fluid flow arrow 73. Thus, flow 71 through main flow channel 19 may alternately proceed through either injection port 23a or 23b, or in certain embodiments through both injection ports, and injection through the two ports may be controlled from the surface. Status of the bistable actuator may be transmitted to the surface by appropriate communication link. Optionally, distributed measurements, e.g., temperature between the flowmeters 64 and 66, may be provided.

Systems of the invention may be coupled with various packer configurations to attain a more robust isolation solution. Packers useful in the invention include, but are not restricted to, inflatable, swellable, and/or straddle packers.

Figure 7:
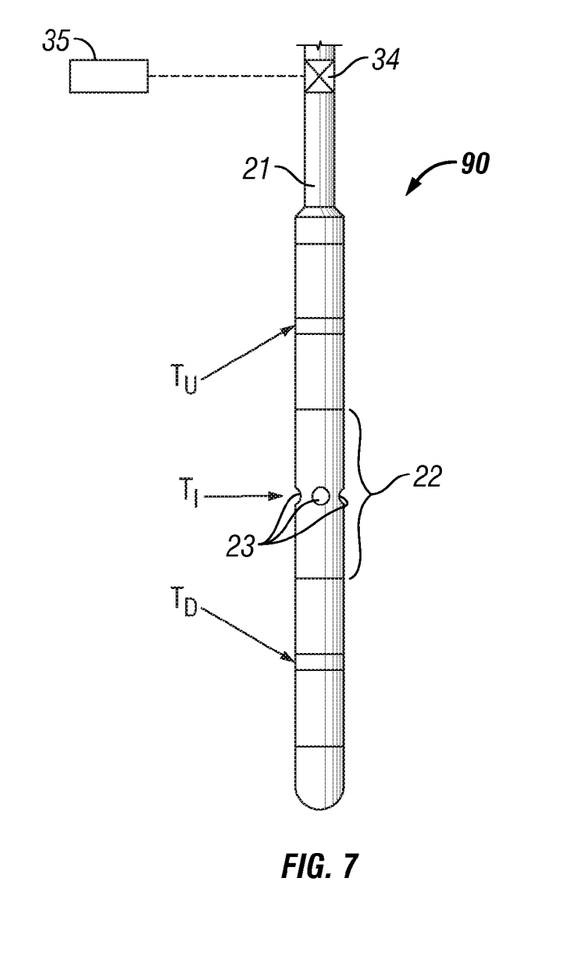
FIGS. 7-10 are schematic side-elevation views of other fluid diversion system embodiments of the invention.

A temperature-based system of the invention may be configured as illustrated in embodiment 90 of FIG. 7. The system of embodiment 90 reports the temperature $T_i$ of the fluid just as it exits the toolstring through injection ports 23, and temperatures $T_u$ and $T_d$ at known distances above and below injection ports 23 of the system. If basic assumptions about the wellbore and injected fluid properties are made, and the measurement points are close enough to be approximated as identical positions it is possible to approximate the amount of fluid traveling uphole and downhole in the annulus based on the amount of energy transferred to/from the fluid.

In general one would assume the fluid being pumped is cooler than the wellbore, therefore, one would expect $T_u$ (fluid temperature uphole) and $T_d$ (fluid temperature downhole) to be greater than $T_i$ (temperature at injection ports). In the simplest form the differential flow may be calculated using the following equations. In the absence of CT flow, one may expect $T_u$ and $T_d$ to be similar in magnitude. This fact may be used to calibrate prior to pumping.

$\Delta T_u$=Temperature difference to uphole sensor;
$\Delta T_d$=Temperature difference to downhole sensor;
$Q_i$=fluid flow exiting tubular, or being injected through injection ports;
$Q_u$=Flowrate of injected fluid moving uphole (percent);
$Q_d$=Flowrate of injected fluid moving downhole (percent);

$\Delta T_u = T_u - T_i$ and $\Delta T_d = T_d - T_i$;

$\Delta T_{tot} = \Delta T_u + \Delta T_i$;

$Q_u = (1 - \Delta T_u / \Delta T_{tot}) * 100$; and $Q_d = (1 - \Delta T_d / \Delta T_{tot}) * 100$.

Using these equations, assume $T_i$=100 C, $T_u$=120 C and $T_d$=105 C. $Q_u$ would equal 20% and $Q_d$ would equal 80%. One may envision an example where one $\Delta T_{tot}$ would be negative, which would indicate cross flow in the wellbore. One may also easily understand that the heat transfer could be modeled more rigorously, and these more rigorous models are considered within the invention. It should also be clear from this description that the system and process could be extended to 4 points (2 above and 2 below) or more to increase resolution.

Figure 8:
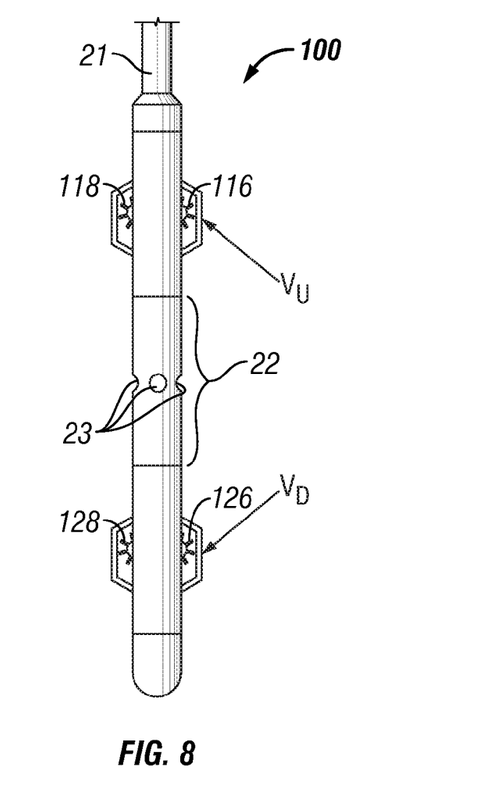
Figure 9:
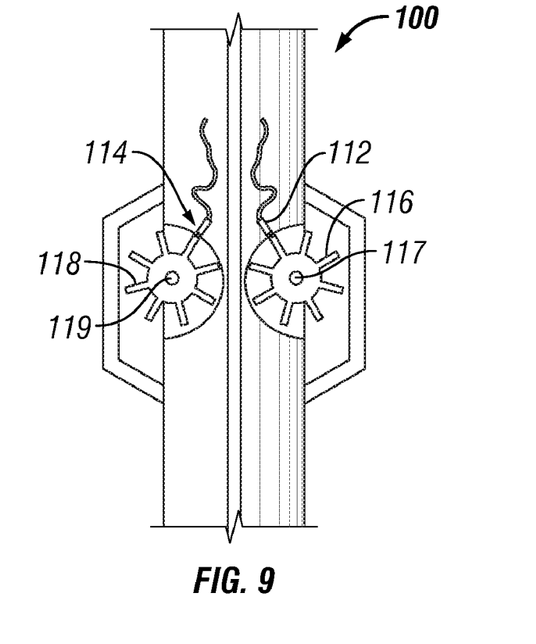

A spinner-based system of the invention may be configured as illustrated in embodiment 100 of FIG. 8. The system may report the velocity of the injected fluid moving past the uphole spinner sub $V_u$ and downhole spinner sub $V_d$ of this embodiment. Typically, spinners are turbine-like parts which spin around a shaft that is aligned with the axis of the tool/wellbore. Additionally, they often use seals on the shaft to keep wellbore fluids from contacting the electronics of the tool. The spinners illustrated schematically in FIGS. 8, 9, and 10 at 116, 118, 126, and 128 are paddle wheel spinners, each of which spin around their own dedicated axis perpendicular to that of the tool/wellbore, as illustrated at 117 and 119 in the partially cut away view of FIG. 9. Furthermore, spinners 116, 118, 126, and 128 do not require a seal on the shaft. FIG. 9 illustrates schematically a detailed cross-section, with parts cut away, of paddle wheel spinners 116 and 118 in system embodiment 100. Spinner rotational velocity is determined by monitoring each paddle wheel with a Hall effect sensor, 112 and 114. As FIG. 9 implies, the use of Hall effect sensors means that the electronics may be removed from the rotating parts, greatly simplifying the design. While Hall effect sensors may require appropriate selection of materials for the principle to work, the assumption herein is that this is within the skill of the ordinary artisan in the sensor art, and that parts and components may be designed and manufactured with minimal experimentation.

It is possible to design the spinners such that the pattern of pulses indicates the direction of spin and thus flow of fluid (similar to quadrature encoders), which would yield the direction and speed of the fluid passing the spinner. Again the assumption is that the percentage of fluid moving uphole and downhole is more important that the actual flowrate moving past each section of systems of the invention. In this case the velocity (speed and direction) of the spinner is compared using equations similar to that of the temperature based model:

Vu=Velocity of the uphole spinner;
Vd=Velocity of the downhole spinner;
$Q_i$=fluid flow exiting tubular, or being injected through injection ports;
$Q_u$=Flowrate of injected fluid moving uphole (percent);

$Q_d$=Flowrate of injected fluid moving downhole (percent);

$V_{tot}=V_u+V_i$;

$Q_u=\Delta V_u/\Delta V_{tot})*100$; and $Q_d=\Delta V_d/\Delta V_{tot})*100$.

The same process could be applied to the typical axial spinner, and enhanced modeling could be used to better approximate the actual flow passing both sections of the tool.

Furthermore, there are other means of interrogating a paddle wheel spinner, such as optically sensing the blade of the paddle, are considered within the invention.

Figure 10:
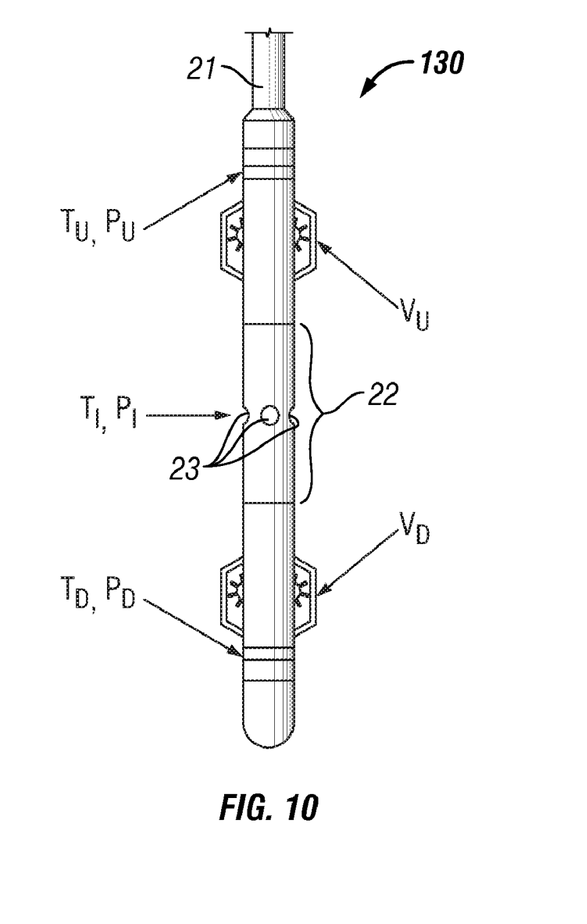

In some inventive embodiments, energized fluids are pumped into the wellbore, and the expansion of the gas may affect both the temperature and the velocity of the fluid. The system embodiment 130 of FIG. 10 illustrates schematically temperature sensors $T_u$, $T_d$, and pressure sensors $P_u$, $P_d$, positioned near each spinner section $V_u$ and $V_d$, and temperature sensor $T_i$ and pressure sensor $P_i$ positioned near injection port 23. These measurements are to be used to account for the expansion of a gaseous fluid. The calculations for the correction are involved and not illustrated here; however, ordinary skilled artisans have knowledge of these calculations and their implementation.

Systems and methods of the invention may comprise, but are not limited to, different combinations of sensors and measurements above and below the fluid injection port or ports in the tubular to determine and/or verify diversion of the fluid. These measurements and sensors may include flow meter spinners, electromagnetic flow meters, thermal active temperature sensors, thermally passive temperature sensors, pH sensors, conductivity, resistivity, optical fluid sensors and radioactive and/or non radioactive tracers with detection sensors. Each type of sensor has advantages and disadvantages, as detailed in Table 1. Systems and methods of the invention may use information from one or more sensors in realtime to evaluate and change, if necessary the treatment. This allows for command and control from the surface or at the tool face via downhole flow control devices 34, best seen in FIG. 7 and/or changing injection hydraulics in both the annulus and tubing injection ports at the surface. The flow control devices 34 may be in communication with a controller 35. Certain of the inventive downhole tool systems may have multiple measurement sensors that detect fluid flow out of the tubular, below the tubular distal end, and up the annulus between the tubular and the wellbore. Algorithms allow realtime interpretation of the downhole data and allow changes to be made at the surface or downhole for effective treatment. Systems of the invention may control fluid direction and/or control in realtime mode.

TABLE 1

Sensor Matrix

| | Spinner | EM | Thermal active | Thermal passive | Tracer |
|---|---|---|---|---|---|
| Spinner | Not easy to build and deploy, and may be expensive | | | | |
| EM | | | Where EM fails, thermal works. Both are rigid, not extrusive + pressure, temperature and CCL measurements | Works at low flow rates for thermal passive Need very accurate temperature calibration downhole No redundancy | Tracer tools still not convincing, and tracers will not give a continuous measurement. Tracers may work at low flow rates. |
| Thermal active | | | | | |
| Thermal passive | | | | | |
| Tracer | | | | | |

If needed, specialized fluid sub-systems as part of, for example, injected fluid 70 and 72 may be provided having the ability to allow improved diversion through command and control.

This may include various fluids that are compatible with the main diversion fluid and may be mixed downhole with the main diversion fluid. Thixotropic fluids and two-stage epoxies are examples of fluids that maybe injected before or after a main downhole fluid, or mixed with a main fluid prior to being diverted downhole. Systems and methods of the invention may also include placing fluid in a prescribed location in the wellbore via the downhole flow control device 34, changing the injection hydraulics in the annulus and tubular from the surface and/or use of downhole isolation devices (single or multiple). A downhole valve mechanism to control flow in multiple directions downhole may be employed. Electrically controlled sliding sleeves, ball valves and/or orifice fluid control mechanisms including varying hydrostatics and density may be employed.

The use of realtime acquisition hardware and software may be used to control the diversion of fluid in the reservoir. This acquisition may be performed at surface or downhole. This data acquisition allows programmable events to be monitored so they may be controlled where needed downhole. Algorithms useful in the invention that allow quick realtime interpretation of data include those based neural networks and control logic.

Methods of the invention include those that may employ a pre-job design that may be executed and/or evaluated in real-time during a fluid diversion operation to ensure treatment fluid is efficiently diverted in a reservoir. The inventive methods may employ multiple sensors and measurements that are strategically placed, adapted for flow measurements in coiled tubing, drill pipe, or any other type of tubular. The fluid and/or mixture of fluids/solids/gases may be to stimulate, provide conformance or isolate the reservoir for enhanced production or isolation (non-production). Any number of measurements, data acquisition and fluid control devices may be used.

The job design process may be as follows:
1. Design job with client data.
2. RIH with stimulation diversion measurement system.
3. Perform stimulation treatment.
4. Using realtime data, adjust treatment with command and control.
5. Repeat in multiple sections in well until treatment is complete.

This process may also be thought of comprising a prior step, whereby a basic suite of downhole measurements (and in particular distributed temperature) may be used to derive a base injectivity profile. This may be derived from well-established techniques such as bullheading and warmback analysis, or other interpreted techniques based on prior measurements of the formation characteristics.

Systems of the invention may comprise a plurality of primary flow measurement sensors coupled with distributed measurements that are straddled by the main flow measurement sensors. In one embodiment this could be considered as a distributed temperature measurement between two electromagnetic flowmeters such as those illustrated in FIG. 2. If electromagnetic flowmeters are used, systems of the invention may comprise a signal processing package so that the analysis of the flow regime and conditions may be carried out downhole, and merely information rather than data then sent uphole.

Systems of the invention may be powered locally by battery, fuel cell, fluid flow, or other local power source, such as spinners as alluded to herein. Systems of the invention may include a two-way communication link to the surface, which may be a fiber optic line, wire line, wireless, or "short-hop" method that provides two-way communication that makes the system operation easier and safer. For example, a position sensor may be used to signal to surface whether a spinner or actuator is spinning or in an up or down position. The operator may then be confident that the fluid diversion is proceeding, and the operator may stop fluid diversion if necessary. Systems and methods of the invention may also employ a failsafe signal line from surface to downhole. If present, the operator may fire a light source to the tool if it is desired to stop or start fluid diversion. If the operator decides to stop fluid diversion, or if the signal line is damaged or broken, the failsafe light source is removed. When this is detected at the tool, the tool may automatically return the system to a safe position. In other words, even if the communications link is broken and the operator cannot pump diversion fluid or manipulate the tubular (e.g. a parted coiled tubing), systems of the invention may be designed to return to a safe position.

An optional feature of systems of the invention is one or more sensors located at the tool to detect the presence of hydrocarbons (or other chemicals of interest) in the fluid traversing up main passage 19 during a fluid diversion procedure, e.g., fluorescence measurements. The chemical indicator may communicate its signal to the surface over a fiber optic line, wire line, wireless transmission, and the like. When a certain chemical is detected that would present a safety hazard if allowed to reach surface (such as oil or gas), the system is returned to its safe position, long before the chemical creates a problem.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A method comprising:
   (a) removably inserting a tubular into a wellbore, the tubular comprising a section of tubing having at least one fluid injection port, the tubular not in sealed contact with the wellbore;
   (b) injecting a fluid through the at least one fluid injection port; and
   (c) determining differential flow of the fluid at one or more points upstream and downstream of the fluid injection port based on measuring one or more parameters, wherein the injecting and the determining are performed without isolating the injection port from the wellbore, and wherein the one or more measured parameters are measured at a plurality of points upstream and downstream of the of the injection port.

2. The method of claim 1 comprising measuring flow out of the tubular.

3. The method of claim 1 wherein the tubular is selected from coiled tubing or sectioned pipe, wherein sections of the sectioned pipe may be joined by means selected from welds, threaded fittings, flanged fittings, and combinations thereof.

4. The method of claim 1 wherein the injecting of the fluid is through the tubular to a bottom hole assembly attached to a distal end of the tubular.

5. The method of claim 1 wherein the determining differential flow comprises activities selected from monitoring, programming, modifying, and measuring the one or more parameters selected from temperature, pressure, rotation of a spinner, measurement of the Hall effect volume of fluids pumped, fluid flow rates, fluid paths, acidity (pH), fluid composition, fluid electrical conductance, fluid electrical resistance, turbidity, color, viscosity, specific gravity, density, and combinations thereof.

6. The method of claim 1 comprising executing a pre-job fluid diversion design in realtime.

7. The method of claim 6 comprising activities selected from evaluating, modifying, or programming the fluid diversion design in realtime.

8. The method of claim 1 comprising controlling the injecting of the fluid via one or more flow control devices and/or fluid hydraulic techniques to divert and/or place the fluid into a desired location that is determined by objectives of an operator or owner.

9. The method of claim 1 wherein the injecting of the fluid occurs while the section of tubular is stationary or moving in the wellbore.

10. The method of claim 1 wherein the determining differential flow of the fluid comprises measuring at least velocity and direction of the fluid.

11. A method comprising:
    (a) inserting a section of coiled tubing into a wellbore, the coiled tubing comprising a section of tubing having at least one fluid injection port and not in sealed contact with the wellbore;

(b) injecting a fluid through the at least one fluid injection port; and (c) executing a pre-job fluid diversion design in realtime by determining in realtime flow of the fluid out of the at least one fluid injection port, up an annulus above the at least one injection port, and down the annulus below the at least one injection port, based on measuring in realtime one or more parameters, wherein the pre-job fluid diversion design is conducted without isolating the fluid injection port from the wellbore.

12. The method of claim 11 comprising measuring flow out of the coiled tubing.

13. The method of claim 11 comprising activities selected from monitoring, programming, modifying, and measuring the one or more parameters selected from temperature, pressure, rotation of a spinner, measurement of the Hall effect, volume of fluids pumped, fluid flow rates, fluid paths, acidity (pH), fluid composition, fluid electrical conductance, fluid electrical resistance, turbidity, color, viscosity, specific gravity, density, and combinations thereof.

14. The method of claim 11 comprising controlling the injecting of the fluid via one or more flow control devices and/or fluid hydraulic techniques to divert and/or place the fluid into a desired location that is determined by objectives of an operator or owner.

15. The method of claim 11 wherein the measuring comprises measuring at least velocity and direction of the fluid.

16. A system comprising:
(a) a section of tubular removably insertable in a wellbore, the tubular having a main flow passage and a fluid injection port, the section of tubular adapted to be either moving or stationary during a fluid diversion operation, the tubular not in sealed contact with the wellbore;
(b) at least two sensors in the section of tubular, at least one sensor located upstream of the fluid injection port and at least one sensor located downstream of the fluid injection port, each sensor adapted to measure a parameter of a fluid diverted into the wellbore through the fluid injection port; and
(c) means for using the measured parameters in realtime to monitor, control, or both monitor and control diversion of the fluid without isolating the fluid injection port from the wellbore.

17. The system of claim 16 comprising at least one sensor able to detect flow out of the tubular.

18. The system of claim 16 further comprising means to alter a position of the tubular within the wellbore to control the fluid diversion operation.

19. The system of claim 16 wherein the sensors are selected from flow meter spinners, electromagnetic flow meters, thermally active temperature sensors, thermally passive temperature sensors, pH sensors, resistivity sensors, optical fluid sensors and radioactive and/or non-radioactive tracer sensors.

20. The system of claim 16 wherein the means for using the measured parameters comprises means selected from:
(a) means to evaluate and change, if necessary, one or more of the parameters of the fluid diversion selected from command and control sub-systems located at the surface, at the tool, or both;
(b) downhole flow control devices and/or means for changing injection hydraulics in both an annulus and the tubing injection port from the surface;
(c) a plurality of the sensors capable of detecting fluid flow out of the tubular, below the tubular and up the annulus between the tubular and the wellbore in realtime mode that have programmable action both downhole and at the surface, adapted to use one or more algorithms allowing realtime interpretation of downhole data, allowing changes to be made at surface or downhole for effective treatment.

21. The system of claim 16 comprising one or more of the following sub-systems:
(a) a controller for controlling fluid direction and/or shut off of flow from the surface;
(b) fluid handling sub-systems able to improve the diversion of the fluid through command and control mechanisms performed via preprogrammed algorithms via controlled fluid mixing, controlled changing of fluid properties, or both;
(c) fluid flow control devices capable of placing the fluid in a prescribed location in the wellbore, change injection hydraulics in an annulus and/or the tubular from the surface, and/or isolate a portion of the wellbore;
(d) two identical diversion measurement sensors spaced apart from each other and enough distance above the fluid injection port to measure difference in flow each diversion measurement sensor measures as compared to known flow through an inside of the tubular as measured at the surface;
(e) an the fluid injection port at a bottom of the tubular, with an internal flow measurement device coupled with an upper flowmeter, and an actuator able to switch between an injection point between two flowmeters and one at an end of the tubular.

22. The system of claim 16 comprising a combination of sensors above, below, and at the injection port in the tubular to determine/verify the diversion of the fluid.

23. The system of claim 16 wherein each sensor measures at least velocity and direction of the fluid diverted into the wellbore.

* * * * *